US012411703B2

(12) United States Patent
Ryman et al.

(10) Patent No.: US 12,411,703 B2
(45) Date of Patent: Sep. 9, 2025

(54) VIRTUALIZED APPLICATIONS ON MANAGED VIRTUAL MACHINES

(71) Applicant: Omnissa, LLC, Mountain View, CA (US)

(72) Inventors: Paul Adam Ryman, Beecroft (AU); Stephen Jonathan Parry-Barwick, Sidney (AU); Jairam Choudhary, Palo Alto, CA (US); Arun Passi, San Ramon, CA (US)

(73) Assignee: Omnissa, LLC, Mountain View, CA (US)

( * ) Notice: Subject to any disclaimer, the term of this patent is extended or adjusted under 35 U.S.C. 154(b) by 667 days.

(21) Appl. No.: 17/494,072

(22) Filed: Oct. 5, 2021

(65) Prior Publication Data

US 2023/0106879 A1 Apr. 6, 2023

(51) Int. Cl.
*G06F 9/455* (2018.01)
*G06F 9/54* (2006.01)

(52) U.S. Cl.
CPC .......... *G06F 9/45558* (2013.01); *G06F 9/547* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 8,495,323 | B1* | 7/2013 | Tatavarty | G06F 3/0622 |
| | | | | 711/6 |
| 10,652,241 | B1* | 5/2020 | Bendersky | H04W 12/30 |
| 2014/0181844 | A1* | 6/2014 | Von Bokern | G06F 9/4411 |
| | | | | 719/321 |
| 2017/0371519 | A1* | 12/2017 | Beveridge | G06F 9/45558 |
| 2020/0026540 | A1* | 1/2020 | Venkatesh | G06F 9/5077 |
| 2020/0150987 | A1* | 5/2020 | Nair | G06F 12/1081 |
| 2021/0042050 | A1* | 2/2021 | Schauer | G06F 3/0647 |
| 2022/0066808 | A1* | 3/2022 | Tsirkin | H04L 63/0263 |

* cited by examiner

Primary Examiner — Wynuel S Aquino
(74) Attorney, Agent, or Firm — Kim & Stewart LLP (57) ABSTRACT

Examples of enterprise management using managed virtual machines for virtualized applications are described. In some examples, a managed virtual machine is executed on a host device and enrolled with a management service. A virtualized application drive is stored in the managed virtual machine. A launch agent executed within the managed virtual machine detects an application access request corresponding to user interaction with a host operating system of the host device. The application volumes launch agent accesses the virtualized application drive and launches the virtualized application corresponding to the application access request.

20 Claims, 4 Drawing Sheets

VIRTUALIZED APPLICATIONS ON MANAGED VIRTUAL MACHINES

BACKGROUND

Personal devices are being used for access to enterprise computing systems and resources with greater frequency. More and more companies are now looking to incorporate "bring your own device" (BYOD) concepts for access to enterprise computing systems. With the growing number of BYOD devices, various challenges can arise in management scenarios. For example, the enterprise may use a management service to protect access to enterprise data and enterprise-related functionalities. However, a device may or may not be managed or subject to restrictions, policies, and other management configurations promulgated by the enterprise management. Access to the capabilities of a device can be managed through the administration of the suite of applications based on a set of management policies, compliance rules, and other configuration data which is defined and enforced by the management service. Since a user of a BYOD device can take the device on vacation or other locations without network access, the device may be used for an extended period of time without contacting the management service, causing issues with existing technologies.

Application delivery can also be problematic for BYOD scenarios. Files and registry keys remain on a device, file type associations are not reverted properly, services and resources shared with other applications are incorrectly removed, services are not properly unregistered, application data and log files are not removed, or an uninstallation process fails without proper completion. Often re-installing the same application has issues with these leftover artifacts. This can be unacceptable for enterprise and end users alike.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to enterprise management using managed virtual machines (VMs) and virtualized applications. As outlined above, personal devices are being used to access enterprise applications, data, and other resources with greater frequency. The use of these personal devices can be associated with productivity gains and cost savings. The concept "bring your own device" (BYOD) for access to enterprise resources faces a number of issues, including the provision for offline access. Whether a device is provided by the enterprise or the end user, devices are more often operated from home and other locations that are remote from an enterprise local area network. Application delivery can be problematic for BYOD scenarios. Files and registry keys remain on a device, file type associations are not reverted properly, services and resources shared with other applications are incorrectly removed, services are not properly unregistered, application data and log files are not removed, or an uninstallation process fails without proper completion. Re-installing the same application has issues with these leftover artifacts. This can be unacceptable for enterprise and end users alike. However, the present disclosure provides a more effective solution that can provide both greater flexibility and isolation for virtualized application delivery in enterprise environments.

Figure 1:
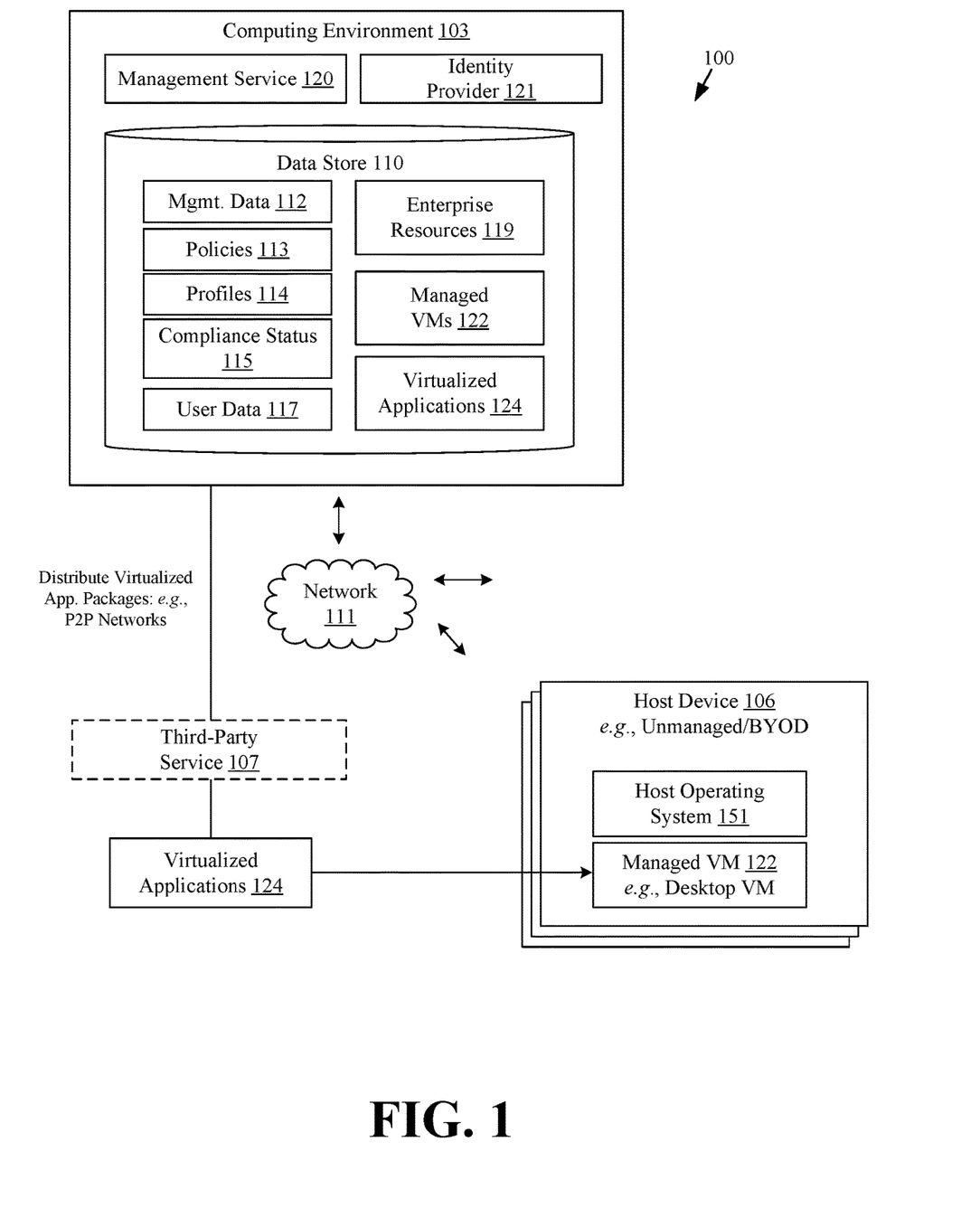
FIG. 1 illustrates an example networked environment for distributing and managing managed virtual machines and virtualized applications, according to various examples described herein.

FIG. 1 illustrates an example networked environment 100 for enterprise management using managed VMs 122 according to various examples described herein. The networked environment 100 includes a computing environment 103 and several host devices 106 in communication through a network 111.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or another distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instructions) elements or modules as described herein.

The computing environment 103 can operate as an environment for mobile device management or a unified endpoint management (UEM) platform that can manage the host devices 106. In that context, the computing environment 103 includes a data store 110. The computing environment 103 can also execute a management service 120 and an identity provider 121. The data store 110 includes areas in memory for the storage of management data 112, policies 113, profiles 114, compliance status 115, user data 117, enterprise resources 119, managed VMs 122, and virtualized applications 124, among other types of data. Enterprise resources 119 can include the virtualized applications 124, as well as other enterprise data, enterprise-provided applications, and other resources.

The management service 120 can operate as a UEM platform that can manage both the managed VMs 122, as well as the host devices 106, that are enrolled with the management service 120 for management. However, the management service 120 can manage the managed VMs 122 even if the host device 106 is unmanaged. An unmanaged host device 106 can include host devices 106 that are not enrolled with the management service 120, and lack management-service-enforced policies, restrictions, profiles, or other management-service-enforced configurations for the host device 106 or the host operating system 151. The management service 120 can be accessible over a public wide area network (WAN) such as the Internet.

Management data 112 can represent information about managed VMs 122 and host devices 106 that are enrolled as managed devices with the management service 120, as well as information about unmanaged host devices 106 on which enrolled managed VMs 122 are executed as guests.

The management data 112 can include a unique VM identifier for the managed VM 122, a device identifier of the host device 106 on which it is executed, certificates associated with the managed VM 122 or the host device 106, a user identifier identifying the user account with which the host device 106 or managed VM 122 is linked, authentication tokens provided by the identity provider 121, configuration profiles 114 and policies 113 assigned to the host device 106 and/or the managed VM 122, and other information regarding management. The management data 112 can also include host specific information such as a virtual or physical trusted platform module (vTPM).

The management data 112 can also include a compliance status 115 associated with the managed host device 106 and/or the managed VM 122. The compliance status 115 can identify which rules are violated by the host device 106, as well as any that are violated by the managed VM 122. For example, the host device 106 may have been taken outside of a specified geofence defined for the host device 106 or the managed VM 122. In another example, the managed VM 122 may fail a signature verification or a hash check of a hash of all or a portion of the managed VM 122.

User data 117 represents information about users who have user accounts in the enterprise. These users can also have one or more host devices 106 and one or more managed VMs 122 that are enrolled as managed entities with the management service 120. User data 117 can include authentication data, and information about third-party services 107 with which the user is assigned an account.

While host devices 106 can remain unenrolled, in some cases, the host devices 106 can enroll with the management service 120 for mobile device management services. To begin enrollment, the management service 120 can identify and authenticate one of the host devices 106 and store data related to the host device 106 in the management data 112 for later reference. In some cases, the management service 120 (or a management component, an application, or a component executing on the host device 106) can also be registered as a device administrator (at least in part) of the host device 106, permitting the management service 120 to configure and manage certain operating aspects of the host device 106.

Once the host device 106 is enrolled for device management by the management service 120, the management service 120 can direct the installation of various software components or applications on the host device 106. The software components can be configured on the host device 106 at the direction of the management service 120. Such software components can include, for example, applications, resources, libraries, and other related components.

The management service 120 can transmit compliance rules including profiles 114, policies 113, and other configuration data for execution by and/or enforcement by a host management component on the host device 106. In that context, during or after enrollment, the management service 120 can retrieve or generate a set of management policies, compliance rules, and configuration data for the host device 106 and transfer those policies, rules, and data to the host device 106 for reference by the host operating system 151 and certain applications executing on the host device 106. The host management component or agent can be executed on the host device 106, and can retrieve and install compliance rules and configuration data for execution and/or enforcement on the host device 106. In other cases, the host device 106 can be unmanaged by the management service, and can lack policies, compliance rules, and configuration data that are enforced for the host user context.

The management service 120 can also transmit compliance rules, policies 113, profiles 114, and configuration data for execution by and/or enforcement by a guest management component of the managed VM 122. In that context, during or after enrollment, the management service 120 can retrieve or generate a set of management policies, compliance rules, and configuration data for the managed VM 122 and transfer those policies, rules, and data to the guest management component of the managed VM 122 for reference by a guest operating system and certain applications of the managed VM 122. A guest management component or agent executed as part of the managed VM 122 can retrieve and install compliance rules and configuration data for execution and/or enforcement on the managed VM 122.

The management service 120 can also provide a management console as an engine and console interface for device management of the host devices 106. An information technology administrator or user, for example, can view, administer, and update the management policies, compliance rules, and configuration data on the host devices 106 using the management console. The policies, rules, and configuration data can be collectively administered for several of the host devices 106 by organizing the host devices 106 into several different groups or categories of devices according to enterprise or other factors or considerations. The management service 120 can ensure compliance of the host device 106 in conjunction with a management component and other instructions executed by the computing environment 103 and the host device 106.

The identity provider 121 can provide single sign-on or identity management capabilities for an enterprise, whether a user is interacting with a user interface of the managed VM 122, or a user interface of the host device 106. The identity provider 121 can allow users to authenticate his or her identity to obtain an authentication token that can be provided to a third-party service 107, which can include a data analysis service, and other services. The identity provider 121 can utilize OAuth, security assertion mark-up language (SAML), or other single sign-on methodologies. The identity provider 121 and management service 120 can communicate so that the management service 120 can revoke or authorize access to various services for users in the enterprise based on status of a host device 106 assigned to the user. The identity provider 121 can also rely on user data 117 in the data store 110. In some examples, the identity provider 121 can rely upon a separate source of user data in a separate data store.

A third-party service 107 can be embodied as one or more computers, computing devices, or computing systems. Like the computing environment 103, a third-party service 107 can include one or more computing devices arranged, for example, in one or more servers or computer banks. The computing device or devices can be located at a single installation site or distributed among different geographical locations. Each of the third-party services 107 can include a plurality of computing devices that together embody a hosted computing resource, a grid computing resource, or other distributed computing arrangements. The third-party services 107 can also be embodied, in part, as certain functional or logical (e.g., computer-readable instructions) elements or modules as described herein. A third-party service 107 can be provided by an enterprise to its users. The third-party service 107 can federate its authentication for users of the enterprise to the identity provider 121. Alternatively, the third-party services 107 can be provided by the computing environment 103, and can be part of the management service 120.

The management service 120 can use the third-party service 107 to deliver and distribute the virtualized applications 124. In some examples, the virtualized applications 124 can be stored using the third-party service 107 rather than the management service 120. In other cases, the virtualized applications 124 can receive the virtualized applications 124 from the management service 120. The third-party service 107 can include a content delivery network, peer to peer network, and other delivery and distribution services. In some cases, the content delivery network, peer to peer network, and other delivery and distribution services can be part of the management service 120.

The host devices 106 can be representative of one or more host devices 106. Each host device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the host devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the host devices 106.

An example host device 106 can also be enrolled by the management service 120 for device management. A host management component can be installed on a host device 106 to locally manage the device on behalf of the remotely executed management service 120. The management component can be installed with elevated privileges or be effectuated through the host operating system 151 application programming interfaces (APIs) to manage the host device 106 on behalf of the management service 120. The management component can have the authority to manage data on the host device 106, install, remove, or disable certain applications, or install policies 113, profiles 114, such as VPN certificates, Wi-Fi profiles, email profiles, etc.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the host devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, and any other network or computing architectures.

In the networked environment 100, the computing environment 103, the host devices 106, and other services can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The managed VM 122 can include a managed VM configuration file, VM configuration files, a non-volatile memory state file, virtual disk files, log files, as well as additional files and data. The managed VM 122 can include a guest operating system and a number of applications, certificates, Wi-Fi profiles, email profiles, and other data. The managed VM 122 can be enrolled with, and managed using, the management service 120. The managed VM 122 can be preconfigured to communicate with one or more management endpoints of the management service 120. The managed VM 122 can include the certificates, credentials, and a management endpoint address to enable this communication. In addition, the managed VM 122 can provide an endpoint to which the management service 120 can transmit or push commands that can be performed by a management agent, service, or component executed within the managed VM 122. A management agent of the managed VM 122 can also periodically check in with the management service 120 to provide operational information, as well as to retrieve commands from a command queue for the managed VM 122.

The managed VM 122 can utilize guest identity coupling with the host device 106 identity. For example, a hostname-detecting instruction for the managed VM 122 can be specified as part of the authoring and packaging process. In some cases, an identity of the host device 106 can be identified and can be used as an identity of the managed VM 122. Alternatively, the identity of the host device 106 can be modified or used in combination with other identifiers, and the modified version of the host identity can be used as an identity of the managed VM 122.

The managed VM configuration file can include a textual or other configuration file, which can store settings chosen during creation of the VM through a console user interface of the management service 120, or another VM settings editor. This can include a .cfg, .vmx, or another file extension. The managed VM configuration file can include file properties that are not included in a typical VM or its configuration file. For example, the managed VM configuration file can include managed VM configuration parameters, among other parameters. The NVRAM file can be a nonvolatile RAM file that can include items that cannot be stored in volatile memory, such as vTPM state and encryption keys, as well as the BIOS state data.

These files can change infrequently and are relatively small in size relative to the whole managed VM 122. The VM password or credentials can be automatically generated and encrypted and stored in a user login keychain for MacOS® or alternatively protected using a data protection API for Windows®. This provides a high key strength and simplicity to the user. In traditional models, if the user forgot their password, the content of the VM could be lost. This either leads to weak passwords or lost data.

The management service 120 can include a packaging tool that packages a base VM into a managed VM package for a managed VM 122. While the packaging tool can be accessed through a console user interface of the management service 120, the packaging tool can also be installed and executed on another computing environment such as an administrator's personal computing device, a host device 106, or another device. The packaging tool can modify a VM base image into a managed VM 122 by writing a managed VM configuration file into the VM base image. This can include modifying a VM configuration file of the VM base image by writing managed virtual machine configuration parameters into the VM configuration file.

The management service 120 can include a provisioning tool that provisions a managed VM 122 on a host device 106. While the provisioning tool can be stored by the management service 120, the provisioning tool can also be installed and executed on a host device 106. The provisioning tool can also be included in a management component or agent installed on the host device 106 for implementing commands provided by the management service 120.

Figure 2:
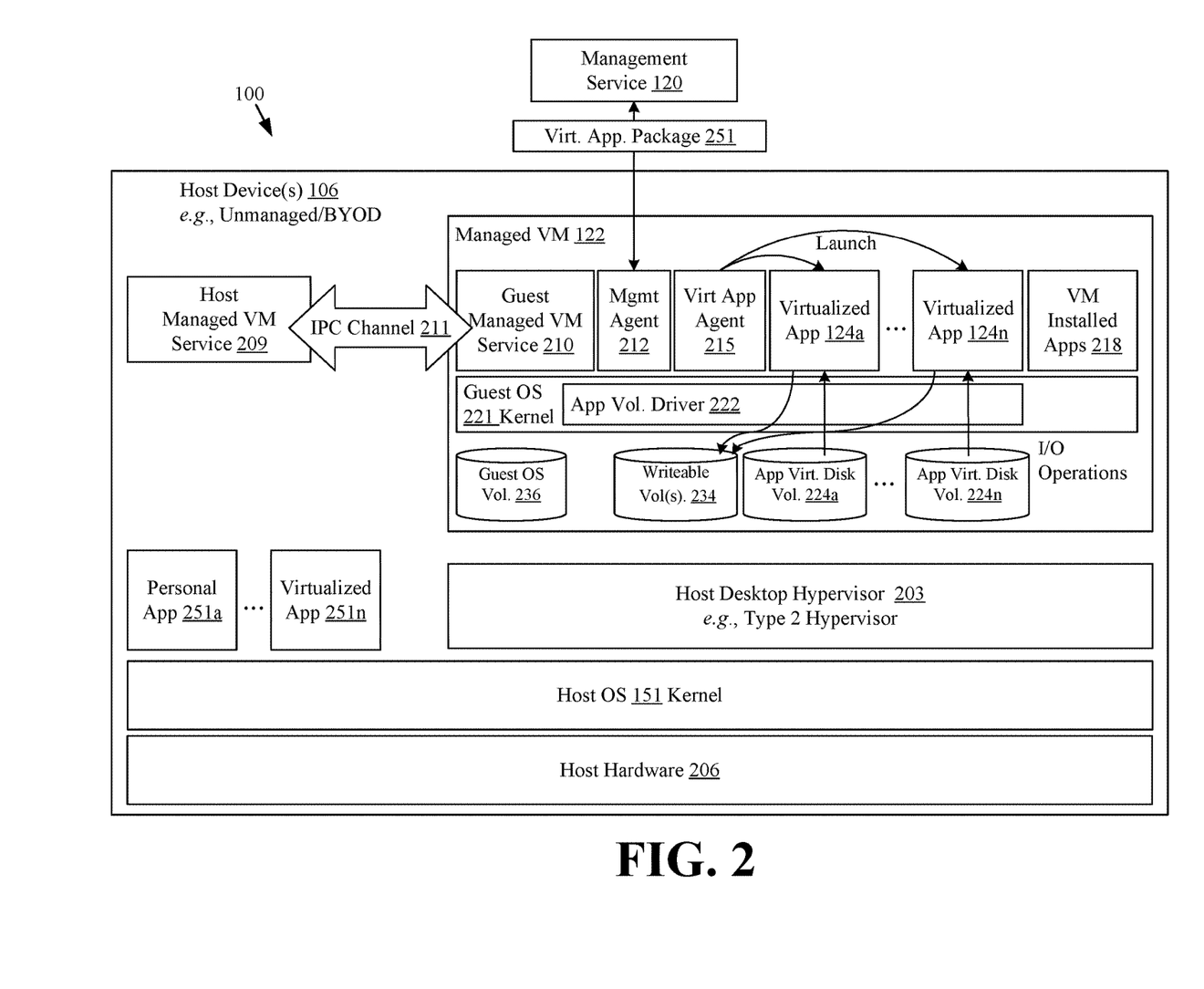
FIG. 2 illustrates an example of packaging a managed virtual machine package and provisioning the managed virtual machine with virtualized applications, according to various examples described herein.

The provisioning tool can initiate and implement a provisioning process. The provisioning process can use a managed VM package to install, configure, and launch a managed VM 122. The provisioning tool can generate and implement command line arguments as well as scripts, API calls and operating system calls. The provisioning tool can:
- Extract the VM files from the managed VM package to a predetermined folder location.
- Verify a digital signature included with the managed VM package, including comparing hashes and verifying that a signer certificate is valid, trusted and not revoked. In some cases, if the package was not signed, no verification is performed.
- Add the managed VM 122 to the host desktop hypervisor 203 inventory of VMs.
- Notify the user that the VM is available to use.
- Provide a user interface element that lists all managed VMs 122 on the host device 106.

Once the provisioning process is completed, a user or provisioning tool can cause the host desktop hypervisor 203 (FIG. 2) to execute the managed VM 122 for the first time. If the auto-add vTPM option is set to software in the managed VM configuration file, then the host desktop hypervisor 203 can add or create a vTPM device to the managed VM 122 using partial encryption and automatic key generation as described. If a user interface locking feature is enabled based on the editability status for editing settings of the managed virtual machine through a host desktop hypervisor 203, the user will not be able to change a predetermined set (or any) of VM settings from the user interface of the host desktop hypervisor 203. The managed VM 122 can be accessed in an out of box experience (OOBE) process if the sysprep or other audit mode instructions have been completed. The enrollment grace period timer can start once the managed VM 122 is executed for the first time and the OOBE process has started. A user can complete the OOBE and begin to use the managed VM 122.

A virtualized application 124 can include a virtualized version of any application utilized for enterprise purposes. Virtualized applications 124 can include Win32 applications and other types of applications. The virtualized application 124 can include a virtual application volume. In some examples, a virtualized application 124 can refer to an application that is provided by mounting a virtual disk containing the application to "layer" applications over a shared operating system kernel. In some examples, the operating system kernel used for the virtualized application 124 is the guest operating system kernel of the managed virtual machine 122, rather than the host operating system kernel of the host device 106. As a result, the managed virtual machine 122 can provide a secure container for all virtualized applications 124. Further, since the virtualized application 124 is launched from a mounted virtual disk file, and write operations are siloed in a predetermined non-operating system write volume, it also does not affect the underlying guest operating system once closed.

The virtualized applications 124, which can include Win32 apps, can also be created and containerized using a lightweight OS-based kernel-level virtualization based on Hyper-V, such as Windows® Sandbox. With an addition or extension to share the host device 106 system files and memory pages with the host device 106 using a copy-on-write approach and integration with a host OS 151 scheduler. This can provide the benefit of full kernel virtualization but with a light memory and storage footprint. By using a method like instant clones, the boot time of a Windows® Sandbox container implementation is also near instantaneous. This implementation can lack of persistence between reboots, all writes during the session are lost, making it only suitable for testing out an untrusted app or accessing a potentially harmful web app in a protected environment. However, persistence can be achieved by directing write operations to a persistent nonvolatile writeable volume.

The management service 120 can include a console user interface through which an administrator or other user can design the managed VM package and its managed VM 122. In order to prepare the managed VM 122, the management service 120 can generate a user interface through which a user can author a generalized Windows® or other VM desktop image. The VM base image can include the guest operating system as well as any applications, services, operating system features and language packs that are required for the base image. The user can select applications, certificates, Wi-Fi profiles, email profiles, data stores, network drives, and data that can be included in the managed VM 122.

The management service 120 can also validate that the VM base image for the managed VM 122 meets the managed VM rules that include packaging rules and Data Loss Prevention (DLP) rules for managed desktop VMs 122. The managed VM rules can include requirements as well as recommendations.

Managed VM 122 rules can specify requirements for the base image of the managed desktop VMs 122. In one nonlimiting example where a VMware® Hypervisor is used, the requirements can include:
- Not a linked clone
- No snapshots or linked clone VM derived from the VM
- No virtual disk files (e.g., .VMDK files) that are not dedicated to the VM (virtual disk files must be dedicated to the VM)
- The VM must not be marked as a template
- The VM working directory must be a current directory containing the VMX
- Minimum VM hardware version (e.g., >=14)
- Windows® 10 or another acceptable guest operating system
- Firmware type must be UEFI
- Only boot from HDD is permitted (no network or CD-ROM booting)
- Network devices must be bridged or NAT only (host-only and custom adapters not permitted)
- CD/DVD devices must be pass-through or "raw" devices only (i.e., not mapped to an ISO file)
- Floppy drives devices are not permitted Parallel port and virtual printer devices are not permitted Serial port devices are not permitted Pass-through SCSI devices are not permitted All HDD devices must map to virtual disk files ("raw" device pass-through is not permitted)

Virtual disk files must exist in the same directory, to limit the chance of packaging a shared virtual disk file Camera devices are not permitted USB devices other than Hub and HID devices are not permitted Pass-through to host sound card devices are not permitted Shared folders must be disabled Option to snapshot the VM on power off must be disabled The AutoProtect rolling snapshotting feature must be disabled VNC connections must be disabled All appliance view settings including port must not be set Proxy app support either host-to-guest or guest-to-host must be disabled Recommendations for the managed VM rules can include:

Enable secure boot

Do not share Bluetooth devices with the host

Disable guest isolation drag-and-drop

Disable guest isolation copy-and-paste

Do not synchronize guest time with the host

Do not use Tool scripts

Do not gather VM debug information

Do not clean up disks after VM shutdown

Enable Full or Partial Disk Encryption for the Managed VM 122

The management service 120 can also sign and package the managed VM 122 into a managed VM 122 in a format that can be deployed with any of: product cost and life cycle management (PCLM), system center configuration manager (SCCM), active directory (AD) or other products; a UEM or mobile device management (MDM), such as the management service 120 or a legacy management service; manual or enterprise script-based deployment using a removable drive, a file share, an FTP, or similar systems.

A packaging tool can package a base VM into a managed VM 122. The packaging tool can generate and implement command line arguments as well as scripts, API calls, and operating system calls. The packaging tool can:

Provide a user interface through which a powered-down VM can be selected. For example, a .vmx file of a VM that has been designed through the user interface, or another VM can be selected for distribution as a managed VM 122.

Perform checks on the base VM to ensure an acceptable configuration for a managed VM 122 based on the managed VM rules outlined above.

Provide a user interface through which a managed VM enterprise identifier can be entered, selected, or otherwise added to the VM .vmx file. The managed VM enterprise identifier can be associated with a set of enterprise-specific policies, baselines, profiles, applications, certificates, and other enterprise resources 119 to be included in a user context configuration of the managed VM 122.

Provide a user interface through which an enterprise display name can be entered, selected, or otherwise added to the VM .vmx file.

Provide a user interface through which a user group identifier can be entered, selected, or otherwise added to the VM .vmx file. The user group can be associated with a set of user group-specific policies, baselines, profiles, applications, certificates, and other enterprise resources 119 to be included in a user context configuration of the managed VM 122.

Generate a digital signature based on an admin-provided certificate such as an enterprise certificate or a management service certificate. The single digital signature or multiple digital signatures can be generated based on the certificate and one or more of: the managed VM configuration file (or a subset of protected configuration settings within the managed VM configuration file), the virtual disk .vmdk file or files, and the NVRAM file.

Provide a user interface through which a user can enter or select an enrollment grace period or period of time within which the managed VM 122 must enroll, re-enroll, check in, or otherwise contact the management service 120 to maintain enrollment Provide a user interface through which a user can specify a cryptographic method that indicates whether a hardware-based crypto-processor, or a software-based or virtualized crypto-processor is to be used. The packaging tool can include a user interface through which a user can create, install and uninstall command-line arguments and scripts to use for PCLM, MDM, or manual deployment and provisioning.

The managed VM configuration file can include protected parameters that are identified by the packaging tool at packaging time. These protected parameters can include a selected set of the managed VM enterprise identifier, the enterprise display name, the user group identifier, the grace period, the security level or cryptographic method, and others as discussed.

The packaging tool can generate the managed VM 122 to include a .ppkg file and an unattend.xml file. The .ppkg file and an unattend.xml file can be copied to the managed VM 122. The .ppkg file can include the files of the managed VM 122 as well as enterprise- and user-group-specific policies, baselines, profiles, applications, certificates, and other enterprise resources 119. The files of the managed VM 122 can include a managed VM configuration file, an NVRAM file, virtual disk (.vmdk) files, a log file, as well as additional files and data. The managed VM 122, or the .ppkg, can also include a signature and a number of additional files that are not part of the managed VM 122, or the signature. For example, a signing verification or signed parameter file, as well as other configuration files. The packaging tool can identify or receive the enterprise resources 119 from the management service 120 based on a request that includes the managed VM enterprise identifier and the user group identifier.

Once packaged, the managed VM 122 can be distributed to the host device 106 by the management service 120, a third-party or legacy PCLM, SCCM, AD, UEM, MDM, or other management service, manually, or using a script. The managed VM 122 can be accessed during deployment through a removable drive connected to the host device 106, a file share accessed by the host device 106, an FTP, or similar systems. The management service 120 can, in some cases, distribute the managed VM 122 to the host device 106 once a host managed VM service and the host desktop hypervisor are installed.

A provisioning tool can be included with the host managed VM service 209 (FIG. 2) or can be provided separately. In some cases, the provisioning tool can automatically select the .ppkg file and an unattend.xml file from the managed VM 122, or can provide a user interface through which a user can select the .ppkg file and an unattend.xml file, and a user interface element to install the managed VM 122.

The provisioning tool can verify authenticity and integrity of the managed VM 122 based on a managed VM digital signature that is based on a management service 120 or enterprise certificate. Once the authenticity and integrity of managed VM 122 is verified, the host managed VM service 209 can setup host-device-specific VM settings including adding a vTPM device with encryption and generating a unique VM identifier for the managed desktop VM 122.

The provisioning tool can also add the managed VM 122 to a VM inventory of the host desktop hypervisor of the host device 106. The host managed VM service can then notify a user of the host device 106 that the managed VM 122 is ready for use.

FIG. 2 can illustrate an example of packaging a managed virtual machine package and provisioning a managed VM 122 with virtualized applications 124 a host device 106 using components of the networked environment 100. The managed VM 122 can be used as a provisioning package to install the managed VM 122 on the host device 106.

The host device 106 can include a host desktop hypervisor 203, a host managed VM service 209, and a managed VM 122. The host managed VM service 209 can be used in concert with a guest managed VM service 210 for management of the managed VM 122. The host managed VM service 209 can be used primarily for communications through the IPC channel 211 between the managed VM 122 environment and the host environment. The host managed VM service 209 can lack a network communication ability, and does not communicate with the management service 120. As a result, the host device 106 can be considered a management agentless device that lacks a management agent 212 that is configured to authenticate and communicate with the management service 120.

The managed VM 122 can include the guest managed VM service 210, a guest management agent 212, a virtual application agent 215 or another launch redirection agent, and virtualized applications 124a . . . 124n. Virtualized applications 124a . . . 124n can be launched from mounted application virtual disk volumes 224a . . . 224n. VM installed applications 218 can be installed to a guest operating system volume 236. The managed VM 122 can also include a guest operating system 221 and a guest operating system volume 236 where the guest operating system 221 is installed.

The managed VM 122 can also include certificates, Wi-Fi profiles, email profiles, and other guest user context configurations according to the profiles 114 and policies 113 associated with a user group or a user of the host device 106. The managed VM 122 can also include enterprise data that is accessed by the applications and guest operating system 221 of the managed VM 122. The managed VM 122 can further include links or addresses to create and access network drives and network services that provide the enterprise data.

The managed virtual machine 122 within the host device 106 is managed using the management agent 212 or UEM agent. As a result, enterprise software and applications can be managed to comply with policies 113, profiles 114, and other configurations, while the underlying host device 106 is not actively managed for compliance with the policies 113 and profiles 114. For example, many users of host devices 106 do not opt to use full volume encryption, which can be required by policies 113 and profiles 114 enforced by the management agent 212. However, the entirety of the managed virtual machine 122 can be enforced to use full volume encryption, including the application virtual disk volumes 224a . . . 224n, the writeable volume or volumes 234, the guest operating system volume 236, as well as all data corresponding to the managed virtual machine 122. While this data is stored using the underlying host hardware 206 that is allocated to the managed virtual machine 122, the host operating system 151, the personal applications 251a . . . 251n, and other data for the host environment can be stored in an unencrypted state.

Full or partial disk encryption can be provided using an operating system-based encryption such as BitLocker®, or non-operating-system-based encryption such as VeraCrypt, TrueCrypt, and so on. As a result, while personal applications 251a . . . 251n can be unencrypted, the application virtual disk volumes 224a . . . 224n can be encrypted using operating system-based encryption. Full disk encryption can be enforced for the managed VM 122. Even if the host device 106 is encrypted, the managed VM 122 can benefit from a cloud-based encryption key escrow that maintains the recovery keys for enrolled managed devices and managed VMs 122. The management service 120 can securely store and provide secured access to recover keys escrowed in the cloud-based encryption key escrow and accessible over the Internet, unlike local enterprise intranet based solutions. The disk encryption configurations can be applied equally to any virtual application package 251. For example, application specific virtual disk volumes created for virtualized applications 124, and writeable volume 234 virtual disks can be encrypted as they are created.

Using virtualized applications 124a . . . 124n can provide a number of security features over personal applications 251a . . . 251n, as well as VM installed applications 218. For example, virtualized applications 124a . . . 124n mount virtual disks or application virtual disk volumes 224a . . . 224n containing the corresponding application to "layer" applications over the shared guest operating system 221 kernel. Disk and registry write operations by the application that would otherwise be made to the local guest OS volume 236 can be redirected to a special writeable volume or volumes 234, thus preventing changes to the operating system or other installed applications.

This can be used to avoid app compatibility conflicts and unwanted dependencies common between different installed applications. Uninstalling a traditional Win32 application, for example, can be troublesome—often files and registry keys remain, file type associations are not reverted properly, services and resources shared with other applications are incorrectly removed, services are not properly unregistered, application data and log files not removed, or the uninstallation process fails silently without proper completion. Re-installing the same application can result in issues with leftover artifacts. The use of technologies like virtualized applications 124a . . . 124n for legacy Win32 applications solves these issues. Virtualized applications 124a . . . 124n can allow OS images for the guest OS 221 to be independently updated from the virtualized applications 124a . . . 124n.

The managed VM 122 can provide the isolation, management, security and data loss prevention (DLP) requirements of an enterprise and can provide an environment for hosting work-related applications and data. The management service 120 can provide services to manage the managed VM 122 as it would a typical managed device, but without impacting the host OS 151 and the user's personal environment. The management service 120 can deliver security policies 113 and profiles 114 to limit how data can be shared between the host device 106 environment and the managed VM 122, such as disabling cut-and-paste between host and guest or disabling sharing host files with the guest.

The application layering using virtualized applications 124 provides the additional level of isolation between virtualized applications 124a . . . 124n and the managed VM 122 guest OS 221 itself to ensure application compatibility, and to maintain the guest OS 221 clean and unaffected by the virtualized applications 124.

The use of virtualized applications 124 within the managed VM 122 provides both a level of process-level containerization within the managed VM 122 itself and kernel-level virtualization for a stricter form of isolation of work applications such as the virtualized applications 124 and data from the user's personal applications 251a . . . 251n, as well as data on the host operating system 151. This means the host operating system 151 is unutilized and unaffected by the virtualized applications 124. Using virtualized applications 124 provides the flexibility to add or remove these applications dynamically either as a required app pushed down by the management service 120 and retrieved by the management agent 212, or retrieved on-demand and downloaded to the managed VM 122 upon a user request through a user interface or console provided by the management service 120.

The mounting of application virtual disk volumes 224a . . . 224n received as part of one or more virtual application packages 251 can occur within the managed VM 122 itself. This prevents the need for any operation on the host device 106 to add or remove virtual storage devices. This implies no dependency on the desktop hypervisor APIs allowing this to work for any host desktop hypervisor 203 product including Fusion, Workstation, Player, Hyper-V Parallels, KVM, and VirtualBox, among others. For virtual application packages 251 downloaded previously or cached, no further download of data is required, and the mount operation will occur near instantaneously and can occur on demand. Layered or virtualized applications 124 can also co-exist alongside other non-layered or non-virtualized VM installed applications, all delivered and managed by the management service 120 seamlessly. An administrator can create new virtual application packages 251 for virtualized applications 124 when desired through the console user interface of the management service 120.

Each application virtual disk volume 224 can include a virtual hard disk such as a .vhd file or another type of virtual hard disk file. The managed virtual machine 122 can include instructions that enable the managed virtual machine 122 to mount the .vhd file of the application virtual disk volume 224 on demand, such as when a launch request is detected for a virtualized application 124. For example, the application volume driver can enable the .vhd file of the application virtual disk volume 224 to be mounted to launch the virtualized application 124. The managed virtual machine 122 can unmount the .vhd file of the application virtual disk volume 224 once the virtualized application 124 is closed, or the application virtual disk volume 224 can remain mounted.

A user of the host device 106 can navigate through a user interface provided by the host operating system 151, and can select an icon for an application corresponding to the virtualized application 124. This can transmit an application launch request to the host operating system 151. A launch agent such as the virtual application agent 215 can detect and intercept the application launch request. The virtual application agent 215 can utilize communications received through the IPC channel 211 to detect and intercept the application launch request. The host managed VM service 209 can intercept the application launch request and forward the request or an indication of the application launch request through the IPC channel 211.

The virtual application agent 215 can then mount the application virtual disk volume 224a corresponding to the requested application. The virtual application agent 215 can map a filename or another parameter within the application launch request to a particular application virtual disk volume 224a. Once the application virtual disk volume 224a is mounted, the virtualized application 124a can be generated for display on the host device 106. From the user's perspective it can appear that the virtualized application 124a has launched within the host operating system 151, while it is actually executed using the guest operating system 221 kernel. In other examples, the user can access a user interface of the guest operating system 221 and select the appropriate application icon. In that case, the virtual application agent 215 can identify or intercept the application launch request within the guest operating system 221 and mount the application virtual disk volume 224a corresponding to the requested application to launch the virtualized application 124a. The application virtual disk volume 224a can include a static virtual disk volume file that contains one or more applications that can be mounted in a managed virtual machine 122 as a read-only virtual disk. As a result, the application virtual disk volume 224a is not written to or modified by mounting the application virtual disk volume 224a and launching the virtualized application 124a or virtualized applications 124 therefrom.

One or more writeable volume 134 can be used to redirect all write operations to a separate volume from the guest OS volume 236 and the application virtual disk volumes 224a . . . 224n. The writeable volume 134 can be specific to one or multiple virtualized applications 124, and can be volatile or nonvolatile based on the use case. Using virtualized application writable volumes 134 can protect the underlying guest OS 221 file system from change. Writeable volumes 134 can be utilized on managed VMs 122 as a file container or information silo for one or more virtualized applications 124a . . . 124n. A writeable volume 134 can isolate data from other applications within the managed virtual machine 122, whether virtualized or installed. As can be understood, the managed virtual machine 122 further isolates all application therein from personal applications 251a . . . 251n of the host environment. Write actions from virtualized applications 124a . . . 124n can be handled in a number of ways. For example, the guest OS 221 kernel and the application volumes driver 222 can direct write operations according to the following use cases:

1. No virtual application specific writeable volumes 134: All writes from virtualized applications 124a . . . 124n can be written directly to the guest OS file system.
2. Single nonvolatile application writeable volume 134: All writes are redirected to a single writeable volume 134 for multiple virtualized applications 124a . . . 124n, which can include all or a specified set of siloed applications from the virtualized applications 124a . . . 124n. The set of siloed virtualized applications 124 can be mounted and launched from a single application virtual disk volume 224, or from multiple different application virtual disk volumes 224.
3. Single volatile application writeable volume 134: All writes are redirected to a single writeable volume 134 for multiple virtualized applications 124a . . . 124n, which can include all or a specified set of siloed applications from the virtualized applications 124a . . . 124n, but do not persist between managed VM 122 or host device 106 reboots or application restarts (analogous to a ram disk) The set of siloed virtualized applications 124 can be mounted and launched from a single application virtual disk volume 224, or from multiple different application virtual disk volumes 224.

4. Multiple individual nonvolatile writeable application writeable volumes 134: Each of the virtualized applications 124*a* . . . 124*n* writes to its own specific application writeable volume 134. Writes are not visible or accessible to other applications.

5. Multiple individual volatile writeable application writeable volumes 134: Each of the virtualized applications 124*a* . . . 124*n* writes to its own specific application writeable volume 134. Writes are not visible or accessible to other applications, and do not persist between managed VM 122 or host device 106 reboots or application restarts.

Use case 1 is low in complexity, but provides no protection to the guest OS 221 file system. This is analogous to a monolithic persistent virtual desktop infrastructure (VDI) scenario. Use cases 2 and 3 protect the underlying guest OS 221 file system from change but allows virtualized applications 124*a* . . . 124*n* to share a common view of the aggregated file system and registry. This isolates the guest OS 221 file system from the virtualized applications 124*a* . . . 124*n* but allows all or a specified subset of virtualized applications 124*a* . . . 124*n* to share files and registry keys between each other. Use cases 4 and 5 are the fully isolated modes where writes are private to each virtualized application 124. The volatile use cases can be used to ensure the virtualized application 124 starts in a consistent predetermined state every time, or maybe used to prevent unbounded usage of disk space. This can be utilized for testing, and scenarios where persistent files and customized configuration information is not required.

A mixture of these modes can be used depending on the needs of each virtualized application 124. For instance, a certain virtualized application 124 that writes confidential data can utilize an individual application-specific writeable volume 134, while another set of virtualized applications 124 uses a shared writeable volume 134. A volatile writeable volume can provide a workaround for a legacy virtualized application 124 that tends degrade in performance over time as its cache builds up, while other virtualized applications 124 use nonvolatile writeable volumes 134. While traditional virtualized application 124 deployments can access the application remotely, this solution can deliver the virtualized application 124 for installation on the managed virtual machine 122, which uses the host hardware 206 of the host device 106. As a result, the user can remain productive while offline or outside of an enterprise intranet.

The virtualized applications 124 can include implementations using VMware® AppVolumes, Citrix® App Layering, Liquidware® Flexapp, or container programs such as Docker®.

The managed VM 122 can include a number of security features that can protect and isolate the guest environment of the managed VM 122 from the host environment. This can include automatic provisioning of a vTPM device using partial or full VM encryption and a credential generation model which can be used by the guest to protect Bitlocker® and other keys and credentials using a vTPM device. Management-service-enforced configurations such as policies 113, profiles 114, and restrictions, can be enforced based on the managed VM 122. The managed VM 122 can be signed to ensure authenticity and integrity. The managed VM 122 can include a signature and a signed parameter file. The signed parameter file can include the managed VM configuration file, or all or a subset of the parameters from the managed VM configuration file. A managed VM user interface locking feature can prevent a user of the host device 106 from changing settings of the managed VM 122 from a host desktop hypervisor 203 user interface. Managed VM configuration file parameters can be signed to prevent file tampering with respect to all, or a predetermined set, of parameters of the managed VM configuration file. This can include an option to automatically repair to a default set of parameters if the guest management agent 212, the host managed VM service 209, or the host desktop hypervisor 203 detect that the managed VM configuration file parameters have been altered.

The host managed VM service 209 can communicate with the guest managed VM service 210 through an inter-process communication (IPC) channel 211. The IPC channel 211 can provide bidirectional guest-host and host-guest communications. In some examples, the host desktop hypervisor 203 can include a method of exchanging data that can be utilized to provide the IPC channel 211. The host managed VM service 209 can include an application that runs in the user context ensuring no code runs in system context of the host device 106 and the host OS 151. The host managed VM service 209 can utilize host desktop hypervisor 203 APIs, such as REST APIs, VMREST APIs, and others. Host desktop hypervisors 203 can include, VMware® Workstation, VMware Fusion® and other desktop hypervisors.

The IPC channel 211 can be achieved in a number of ways. For example, one type of IPC channel 211 can include a host-only network that involves provisioning a network device into the managed VM 122 and building the IPC channel 211 using that provisioned network device. This type of IPC channel 211 can support and enable communications using standard TCP/IP, UDP/IP, and other web-based protocols such as REST or gRPC.

Another type of IPC channel 211 can include a custom socket-based service using a remote procedure call (RPC) backchannel of the host desktop hypervisor 203. This RPC backchannel service can use vSockets, other VM communication interface (VMCI) socket capabilities.

Yet another type of IPC channel 211 can include an IPC backchannel of the host desktop hypervisor 203 that operates using vmrun and rpctool. This third type of IPC channel can allow any process running in the user context of the host device 106 to send and receive variables. This type of IPC channel 211 can be limited to passing key value pairs in an asynchronous variable passing manner.

The host desktop hypervisor 203 can be modified to support managed VMs 122. Partial encryption support, including VM protected settings encryption support can be included. For example, the host desktop hypervisor 203 can add a VTPM device to the managed VM 122 using partial encryption and automatic key generation if an auto-add vTPM option is set to software in the managed VM configuration file. The host desktop hypervisor 203 can also support verification that a restricted or protected subset of the parameters of the VM configuration file are unaltered prior to running the managed VM 122, while allowing the unrestricted subset of the parameters of the VM configuration file to be changed. The protected subset can include all or some of the managed VM configuration parameters.

The managed VM 122 can enforce rules based on profiles 114 or policies 113, and in response to commands from the management service 120. For example, the guest managed VM service 210 can identify a failure to comply with profiles 114, policies 113, and other statuses that affect the compliance status 115. Even if the host device 106 is unable to access the management service 120, the guest managed VM service 210 can perform predetermined remedial and other actions based on a failure to comply with a particular policy 113 or profile 114. The guest managed VM service 210 can also perform actions in response to commands received from the management service 120.

The guest managed VM service 210 can transmit a command to perform a certain data modification action through the IPC channel 211 to the host managed VM service 209. The action can include enterprise wipe, which can cause all data, including applications, and all enterprise resources 119 to be removed from the managed VM 122. In addition, the managed VM 122 can be removed from the host device 106 entirely. This can include a command to delete specified data from the managed VM 122, or to delete the managed VM 122 from a file system of the host device 106. The host managed VM service 209 can suspend or stop execution of the managed VM 122 using the host desktop hypervisor 203, and then delete the managed VM 122 or specified data. If only a subset of data from the managed VM 122 is to be removed, the managed VM 122 can be restarted thereafter.

The guest managed VM service 210 can also transmit a lock or unlock command for the managed VM 122 through the IPC channel 211 to the host managed VM service 209. The host managed VM service 209 can use the host desktop hypervisor 203 to prevent the managed VM 122 from executing. In some cases, the lock command can also prevent a user of the host device 106 from logging into the host desktop hypervisor 203, or prevent alteration of certain settings through a user interface of the host desktop hypervisor 203. The guest managed VM service 210 can also cause the host managed VM service 209 to implement networking restrictions for network data originating from the managed VM 122.

Figure 3:
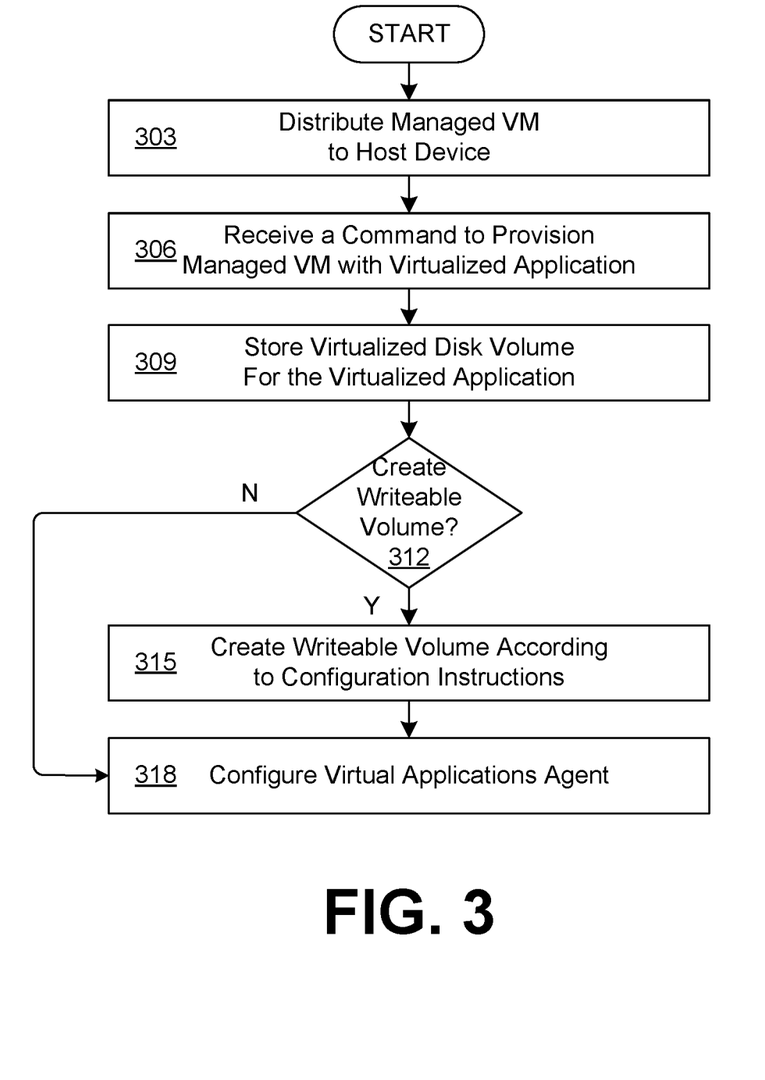
FIG. 3 illustrates a flowchart performed by components of the networked environment, according to various examples described herein.

FIG. 3 shows a flowchart performed by components of the networked environment 100. Generally, the flowchart illustrates how components of the networked environment 100 work in concert to package and provision a managed VM 122 on a host device 106.

At step 303, an administrator can distribute or deploy a managed VM 122 to a host device 106 using a management service 120, a PCLM, SCCM, AD, UEM, MDM, or other management services, manually, or using a script. The managed VM 122, or a distributable package to deploy the managed VM 122, can also be provided through a removable drive connected to the host device 106, a file share accessed by the host device 106, a FTP server, or similar systems. The provisioning tool can provision a managed VM 122 on the host device 106 using the managed VM 122 package. The managed VM 122 package, the host managed VM service 209, or the host desktop hypervisor 203 can include a managed VM provisioning tool. The managed VM provisioning tool can initiate and implement a provisioning process that installs the managed VM 122. The provisioning process can use a managed VM 122 package to install, configure, and launch a managed VM 122.

In some cases, the initial managed VM 122 package can include one or more virtualized applications 124, including virtual disk files to create corresponding application virtual disk volumes 224 and instructions for a writeable volume 234 to create or use for each virtualized application 124. However, in other examples, the managed VM 122 itself is installed and configured with initial settings, and the management agent 212 can then retrieve a user-specific set of configurations associated with a user or user group.

At step 306, the managed VM 122 can receive a command to provision the managed VM 122 with a virtualized application 124. For example, the management agent 212 can check in with the management service 120 and retrieve a command from a command queue for the managed VM 122. The command can include a command to download data of the virtualized application 124 from a network location. The network location can include a uniform resource link (URL), uniform resource identifier (URI), or universal naming convention (UNC) file path among other identifiers. The virtualized application 124 data can include a file such as a virtual disk file. The virtual disk file can include one or more virtualized applications 124. The virtualized application 124 data can also include configuration instructions for how to provision and configure the virtualized application 124 on the managed VM 122.

At step 309, the managed VM 122 can store an application virtual disk volume 224 for the virtualized application 124. For example, the management agent 212 can use the virtual disk file to create the application virtual disk volume 224. The management agent 212 can create the application virtual disk volume 224 as a read-only volume within the host hardware 206 that is allocated to the managed VM 122. In some examples, the application virtual disk volume 224 can include a set of virtualized applications 124. In other examples, the application virtual disk volume 224 can be specific to a single virtualized application 124.

At step 312, the managed VM 122 can determine whether to create a writeable volume 234. Since the application virtual disk volume 224 can be read-only, write operations cannot be directed to that volume. Rather, write operations can be directed to the guest OS volume 236 or a specific writeable volume 234 that is used to silo write operations for one or more virtualized applications 124. For example, the management agent 212 can check the policies 113, profiles 114, and other configuration instructions to identify where write operations are to be performed for the virtualized application 124. The write operation instructions can be user specific, device specific, managed VM specific, or application specific for the virtualized application 124 or a specified group of virtualized applications 124.

The configuration instructions can indicate that a writeable volume 234 is to be created for the virtualized application 124. In some cases, all virtualized applications 124 in the managed VM 122 can share a single writeable volume 234. In other examples, each virtualized application 124 utilizes a corresponding application-specific writeable volume 234. Alternatively, the configuration instructions can also include whitelisted applications with which the virtualized application 124 is permitted to share a writeable volume 234, blacklisted applications with which the virtualized application 124 is prohibited from sharing a writeable volume 234, and so on. The management agent 212 can check a current listing and configuration of writeable volumes 234 and determine whether a writeable volume 234 corresponds to the writeable volumes requirements indicated in the configuration instructions. If a writeable volume 234 is to be created based on configuration instructions and the currently existing writeable volumes 234, then the process moves to step 315. Otherwise, the process can move to step 318.

At step 315, the management agent 212 or other instructions executed on the managed VM 122 can create a writeable volume 234 according to the configuration instructions. The writeable volume 234 can be volatile or nonvolatile according to the configuration instructions. The writeable volume 234 can be used by a single virtualized application 124 or multiple virtualized applications 124 according to the configuration instructions. Once the writeable volume 234 is created, disk and registry write operations by the virtualized application 124 that would otherwise be made to the local guest OS volume 236 can be redirected to the writeable volume 234. This can prevent changes to the guest OS volume 236 or other installed applications such as VM installed applications 218 and personal applications 251 installed to the host device 106.

At step 318, the management agent 212 or other instructions executed on the managed VM 122 can configure the virtual application agent 215 or another launch redirection agent. The management agent 212 or the virtual application agent 215 can request or otherwise facilitate the guest managed VM service 210 to instruct the host managed VM service 209 via the IPC channel 211 to intercept application launch requests and provide an indication of the application launch request through the IPC channel 211. In some examples, the virtual application agent 215 or the management agent 212 can request or otherwise facilitate the guest managed VM service 210 to instruct the host managed VM service 209 via the IPC channel 211 to create an application launch icon that links to instructions for the host managed VM service 209. This can provide an indication of the application launch request through the IPC channel 211.

Figure 4:
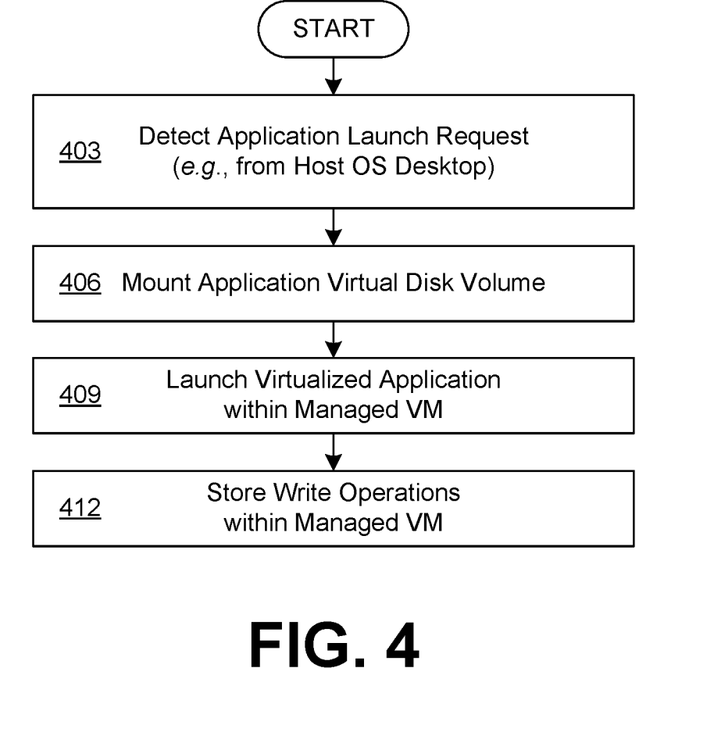
FIG. 4 illustrates another flowchart performed by components of the networked environment, according to various examples described herein.

FIG. 4 shows a flowchart performed by components of the networked environment 100. Generally, the flowchart illustrates how components of the networked environment 100 launch and execute a virtualized application 124 within a managed VM 122 on a host device 106.

At step 403, the virtual application agent 215 can utilize communications received via the guest managed VM service 210 through the IPC channel 211 to detect the application launch request. The host managed VM service 209 can intercept the application launch request and forward the request or an indication of the application launch request through the IPC channel 211.

At step 406, the virtual application agent 215 can mount the application virtual disk volume 224. The virtual application agent 215 can identify the virtualized application 124 associated with or specified by the application launch request. The virtual application agent 215 can utilize the application volumes driver 222 to mount the application virtual disk volume 224 corresponding to the requested virtualized application 124.

In step 409, the virtual application agent 215 can launch the requested virtualized application 124 within the managed VM 122. The virtualized application 124 can be executed using the guest OS 221 kernel of the managed VM 122. While the virtualized application 124 can be executed within the managed VM 122, it can appear from the user perspective the same as any application launched from the host OS 151 and executed using the host OS 151 kernel. The virtualized application 124 can also include applications that do not create a user interface.

In step 412, the virtualized application 124 can store write operations within the managed VM 122. The virtualized application 124 can be configured to direct write operations to the writeable volume 234. The virtual application agent 215, the application volumes driver 222, the guest OS 221 kernel, or other instructions within the managed VM 122 can be used to direct or redirect write operations for the virtualized application 124 to the writeable volume 234. This can protect the guest OS 221, the VM installed applications 218, and the guest OS volume 236 and file system from being affected by the virtualized application 124. If no writeable volume 234 is to be utilized, the virtualized application 124 can write operations to the guest OS volume 236, much like the VM installed applications 218. This can still protect the host OS 151 from being affected by the virtualized application 124. The virtualized application 124 can also access and read from the data written to the writeable volume 234, including data written by other virtualized applications 124 that are directed and permitted to write to the writeable volume 234.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the host devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the host device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate arrays (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method implemented by instructions executed by at least one computing device, the method comprising:
receiving, at a host device from a management service, a managed virtual machine enrolled with the management service and a set of compliance rules to be enforced on the managed virtual machine;
executing, within the host device comprising a host operating system, the managed virtual machine, wherein the managed virtual machine comprises a guest operating system and a management agent that communicates with the management service;
storing, within the managed virtual machine, a virtualized application drive comprising a virtualized application;
receiving an application access request that is generated by input on a user interface displayed by the host operating system of the host device;
intercepting the application access request by a host managed virtual machine (VM) service executing in the host operating system and forwarding the application access request from the host managed VM service to a guest managed VM service executing in the guest operating system of the managed virtual machine, wherein the guest managed VM service provides the application access request to a launch agent executing within the guest operating system of the managed virtual machine;
launching, by the launch agent, the virtualized application in the guest operating system by accessing the virtualized application drive stored in the managed virtual machine; and
enforcing the set of compliance rules received from the management service on the managed virtual machine and the virtualized application by the management agent.

2. The method of claim 1, wherein the host device is not enrolled with the management service, and a host OS file system lacks a component that communicates with the management service.

3. The method of claim 1, wherein the application access request is forwarded through an inter-process communication (IPC) channel established between the host managed VM service and the guest managed VM service.

4. The method of claim 1, further comprising:
storing, within the managed virtual machine, a write operation of the virtualized application.

5. The method of claim 4, further comprising:
creating, within the managed virtual machine, a writeable volume for write operations of the virtualized application, wherein the write operation is stored within the writeable volume.

6. The method of claim 5, wherein the writeable volume is a multiple-application writeable volume utilized by a plurality of virtualized applications corresponding to a plurality of virtual application drives stored within the managed virtual machine and within hardware of the host device.

7. The method of claim 5, wherein the writeable volume is a single-application writeable volume utilized by a single one of a plurality of virtualized applications corresponding to a plurality of virtual application drives.

8. The method of claim 1, wherein in response to a command received by the management agent from the management service, the guest managed VM service transmits to the host management VM service a command to perform an enterprise wipe action that causes the managed virtual machine including all data, applications and enterprise resources to be deleted.

9. A non-transitory computer-readable medium embodying instructions executable by at least one computing device wherein the instructions, when executed, cause the at least one computing device to at least:
receive, at a host device from a management service, a managed virtual machine enrolled with the management service and a set of compliance rules to be enforced on the managed virtual machine;
execute, within the host device comprising a host operating system, the managed virtual machine, wherein the managed virtual machine comprises a guest operating system and a management agent that communicates with the management service;
store, within the managed virtual machine, a virtualized application drive comprising a virtualized application;
receive an application access request that is generated by input on a user interface displayed by the host operating system of the host device;
intercept the application access request by a host managed virtual machine (VM) service executing in the host operating system and forwarding the application access request from the host managed VM service to a guest managed VM service executing in the guest operating system of the managed virtual machine, wherein the guest managed VM service provides the application access request to a launch agent executing within the guest operating system of the managed virtual machine;
launch, by the launch agent, the virtualized application in the guest operating system by accessing the virtualized application drive stored in the managed virtual machine; and
enforce the set of compliance rules received from the management service on the managed virtual machine and the virtualized application by the management agent.

10. The non-transitory computer-readable medium of claim 9, wherein the host device is not enrolled with the management service, and a host OS file system lacks a component that communicates with the management service.

11. The non-transitory computer-readable medium of claim 9, wherein the application access request is forwarded through an inter-process communication (IPC) channel established between the host managed VM service and the guest managed VM service.

12. The non-transitory computer-readable medium of claim 9, wherein, when executed, the instructions further cause the at least one computing device to at least:
store, within the managed virtual machine, a write operation of the virtualized application.

13. The non-transitory computer-readable medium of claim 12, wherein, when executed, the instructions further cause the at least one computing device to at least:
create, within the managed virtual machine, a writeable volume for write operations of the virtualized application, wherein the write operation is stored within the writeable volume.

14. The non-transitory computer-readable medium of claim 13, wherein the writeable volume is a nonvolatile writeable volume utilized by at least one of a plurality of virtualized applications corresponding to a plurality of virtual application drives stored within the managed virtual machine and within hardware of the host device.

15. The non-transitory computer-readable medium of claim 13, wherein the writeable volume is a volatile writeable volume utilized by at least one of a plurality of virtualized applications corresponding to a plurality of virtual application drives stored within the managed virtual machine and within hardware of the host device.

16. A system, comprising:
at least one processor; and
instructions accessible by the at least one processor, wherein when executed the instructions cause the system to at least:
receive, at a host device from a management service, a managed virtual machine enrolled with the management service and a set of compliance rules to be enforced on the managed virtual machine;
execute, within the host device comprising a host operating system, the managed virtual machine, wherein the managed virtual machine comprises a guest operating system and a management agent that communicates with the management service;
store, within the managed virtual machine, a virtualized application drive comprising a virtualized application;
receive an application access request that is generated by input on a user interface displayed by the host operating system of the host device;
intercept the application access request by a host managed virtual machine (VM) service executing in the host operating system and forwarding the application access request from the host managed VM service to a guest managed VM service executing in the guest operating system of the managed virtual machine, wherein the guest managed VM service provides the application access request to a launch agent executing within the guest operating system of the managed virtual machine;
launch, by the launch agent, the virtualized application in the guest operating system by accessing the virtualized application drive stored in the managed virtual machine; and
enforce the set of compliance rules received from the management service on the managed virtual machine and the virtualized application by the management agent.

17. The system of claim 16, wherein the host device is not enrolled with the management service, and a host OS file system lacks a component that communicates with the management service.

18. The system of claim 16, wherein the application access request is forwarded through an inter-process communication (IPC) channel established between the host managed VM service and the guest managed VM service.

19. The system of claim 16, wherein, when executed, the instructions further cause the system to at least:
store, within the managed virtual machine, a write operation of the virtualized application.

20. The system of claim 19, wherein, when executed, the instructions further cause the system to at least:
create, within the managed virtual machine, a writeable volume for write operations of the virtualized application, wherein the write operation is stored within the writeable volume.

* * * * *